United States Patent [19]

Artieri

[11] Patent Number: 5,600,837
[45] Date of Patent: Feb. 4, 1997

[54] MULTITASK PROCESSOR ARCHITECTURE HAVING A PLURALITY OF INSTRUCTION POINTERS

[75] Inventor: Alain Artieri, Meylan, France

[73] Assignee: SGS-Thomson Microelectronics S.A., Saint Genis Pouilly, France

[21] Appl. No.: 248,472

[22] Filed: May 24, 1994

[30] Foreign Application Priority Data

May 27, 1993 [FR] France ................................... 93 06612

[51] Int. Cl.$^6$ ...................................................... G06F 9/06
[52] U.S. Cl. ................... 395/673; 364/228.2; 364/230.3; 364/DIG. 1; 395/677
[58] Field of Search ..................................... 395/650, 700, 395/375; 364/DIG. 1, DIG. 2

[56] References Cited

U.S. PATENT DOCUMENTS

| 4,352,157 | 9/1982 | Namimoto et al. | |
|---|---|---|---|
| 4,462,074 | 7/1984 | Linde . | |
| 5,016,162 | 5/1991 | Epstein et al. | 364/200 |
| 5,255,384 | 10/1993 | Sachs et al. | 395/425 |

FOREIGN PATENT DOCUMENTS

| 0221741 | 5/1987 | European Pat. Off. | G06F 9/26 |
|---|---|---|---|
| 2187577 | 9/1987 | United Kingdom | G06F 9/22 |

OTHER PUBLICATIONS

The 19th Annual International Symposium on Computer Architecture, May 19–21, 1992, Gold Coast Australia, "An Elementary Processor Architecture with Simultaneous Instruction Issuing From Multiple Threads", pp. 136–145.

The 17th Annual International Symposium on Computer Architecture, May 28–31, 1990, Seattle, WA IEEE Computer Society Press, Los Alamitos, CA, "April: A Processor Architecture for Multiprocessing" Anant Agarwal, et al., pp. 104–114.

The 15th Annual International Symposium on Computer Architecture, May 30–Jun. 2, 1988, Honolulu, Hawaii, IEEE Computer Society, "MASA: A Multithreaded Processor Architecture for Parallel Symbolic Computing", Robert H. Halsted, Jr., et al., pp. 443–451.

1994 International Conference on Parallel and Distributed Systems, IEEE Computer Society Press, Los Alamitos, CA, "A Fast Switching Double Processing Architecture for Multi-Tasking Real-Time Systems", Tein–Hsiang Lin, et al., pp. 82–87.

Primary Examiner—Kevin A. Kriess
Assistant Examiner—Majid A. Banankhah
Attorney, Agent, or Firm—David M. Driscoll; James H. Morris; Brett N. Dorney

[57] ABSTRACT

A processor architecture for executing a current task among a plurality of possible tasks. The architecture includes: a plurality of instruction pointers respectively associated with the tasks and each storing the address of the current instruction to be executed of the associated task, only one of these pointers being enabled at a time to supply an address to the memory; a priority level decoder including circuitry for assigning a predetermined priority level to each request signal and for enabling the instruction pointer associated with the active request signal having the highest priority level; and a mechanism for incrementing the content of the enabled instruction pointer and for reinitializing it at the start address of the associated program when its content reaches the end address of the associated program.

17 Claims, 5 Drawing Sheets

MULTITASK PROCESSOR ARCHITECTURE HAVING A PLURALITY OF INSTRUCTION POINTERS

BACKGROUND OF THE INVENTION

1. Field of the Invention

The present invention relates to a multitask processor architecture having a single processor. More particularly, the invention relates to an architecture adapted to real time processing of tasks.

2. Discussion of the Related Art

To control multitask processes, the simplest and least expensive approach is to use a system including a processor that executes several programs, corresponding to tasks, in shared time. If a second program has to be executed by the processor while a first program is being executed, an interruption request is sent to the processor. The interruption request suspends the execution of the first program, if the second program has priority over the first. When the first program is so interrupted, the processor has to save the context of the first program with a "save context" operation. When the execution of the first program is resumed, a restore context operation restores the context that was previously saved. The restore context operation allows the first program to resume from the point at which it was interrupted.

Although multitask processor systems are relatively simple and inexpensive, they are relatively slow due to the fact that each interruption incurs overhead because several instruction cycles must be executed during interruptions. This is so, because an interruption routine is called, which saves the context and locates the starting address of the new program to be executed. Likewise, the restore context is also time consuming.

Such a system becomes unsuitable when the interruption frequency is high and when the tasks must be executed in so-called "real time".

An exemplary real time multitask system is a system designed to process television images, in which an uninterrupted flow of data is received and processed, while an uninterrupted flow of processed data is output. For image processing, pipeline architecture systems are mostly used. Such systems are able to process images at the required data flow rates, but they are very complex and expensive.

EP-A-0,503,956 describes a shared time image processing system, for decompressing video signals compressed in accordance with MPEG standards. In this system, data to be processed are transferred between a memory device, a decoding device, a movement compensation device, and a device for calculating the inverse discrete cosine transform ($DCT^{-1}$). The transfers from these devices are controlled by a specific processor operating by interruptions.

Although the processor used in EP-A-0,503,956 is specifically adapted to transfer data between elements, the interruption overhead remains significant and does not allow such a system to process the presently requested data flow rates.

SUMMARY OF THE INVENTION

An object of the invention is to provide a multitask processor architecture that is particularly fast in passing from the execution of one task to the execution of another task.

A further object of the invention is to provide an image processing system capable of processing very high data flow rates, more particularly the flow rates requested by present standards.

These objects are achieved with a processor architecture for executing a current task from among a plurality of possible tasks, including: a memory for storing instructions of tasks; a processing unit coupled to the memory to receive therefrom successive instructions to be processed; a mechanism for providing active request signals associated respectively with the tasks that request to be served; a plurality of instruction pointers respectively associated with the tasks and each containing the address of the current instruction to be executed of the associated task, one of these pointers being enabled at a time to supply its content as an address to the memory; a priority level decoder including circuitry for assigning a predetermined priority level to each request signal and for enabling the instruction pointer associated with the active request signal having the highest priority level; and a mechanism for incrementing the content of the enabled instruction pointer and for reinitializing it at the start address of the associated program when its content reaches an end address of the associated program.

According to an embodiment of the invention, each instruction includes a command field that is provided to the processing unit and an instruction type field that is provided to a prefix decoder. The prefix decoder includes a mechanism for authorizing a new instruction pointer to be enabled by the priority level decoder, if the type field of the current instruction has a first predetermined value, and includes a mechanism for initializing the content of the enabled instruction pointer to the start address of the current task if the type field of the current instruction has a second predetermined value.

According to an embodiment of the invention, the prefix decoder includes a mechanism to inhibit the incrementation of the enabled instruction pointer if the type field has a third predetermined value, so that the current instruction is successively executed several times, the number of executions being determined by this third value.

According to an embodiment of the invention, the memory having the programs associated with the tasks is independent of a bus which is controlled by the processing unit.

According to an embodiment of the invention, each instruction includes a command field that is provided to the processing unit and an acknowledgement field that is provided to a mechanism for enabling devices that are coupled to the processing unit, when the instruction is being executed.

According to an embodiment of the invention, the devices that are coupled to the processing unit include at least one read-only device which activates an associated request signal to indicate that it needs to transfer data to a transit memory. The acknowledgement of this request selects only this read-only device, while a task for transferring data from the bus to the transit memory is executed. The devices also include at east one writhe-only device, which activates an associated request signal, when it needs to receive data from the transit memory. The acknowledgement of this request selects only this write-only device, while a task for transferring data from the transit memory to the bus is executed.

According to an embodiment of the invention, the processing unit includes a plurality of address calculation functions, each function being selected by a field of a read or write instruction being processed.

According to an embodiment of the invention, each function is associated with an address register connected to an address bus, the function including circuitry for adequately modifying the content of its address register, during each execution of an instruction in the processing unit.

The foregoing and other objects, features, aspects and advantages of the invention will become apparent from the following detailed description of the present invention when taken in conjunction with the accompanying drawings.

DETAILED DESCRIPTION

Figure 1:
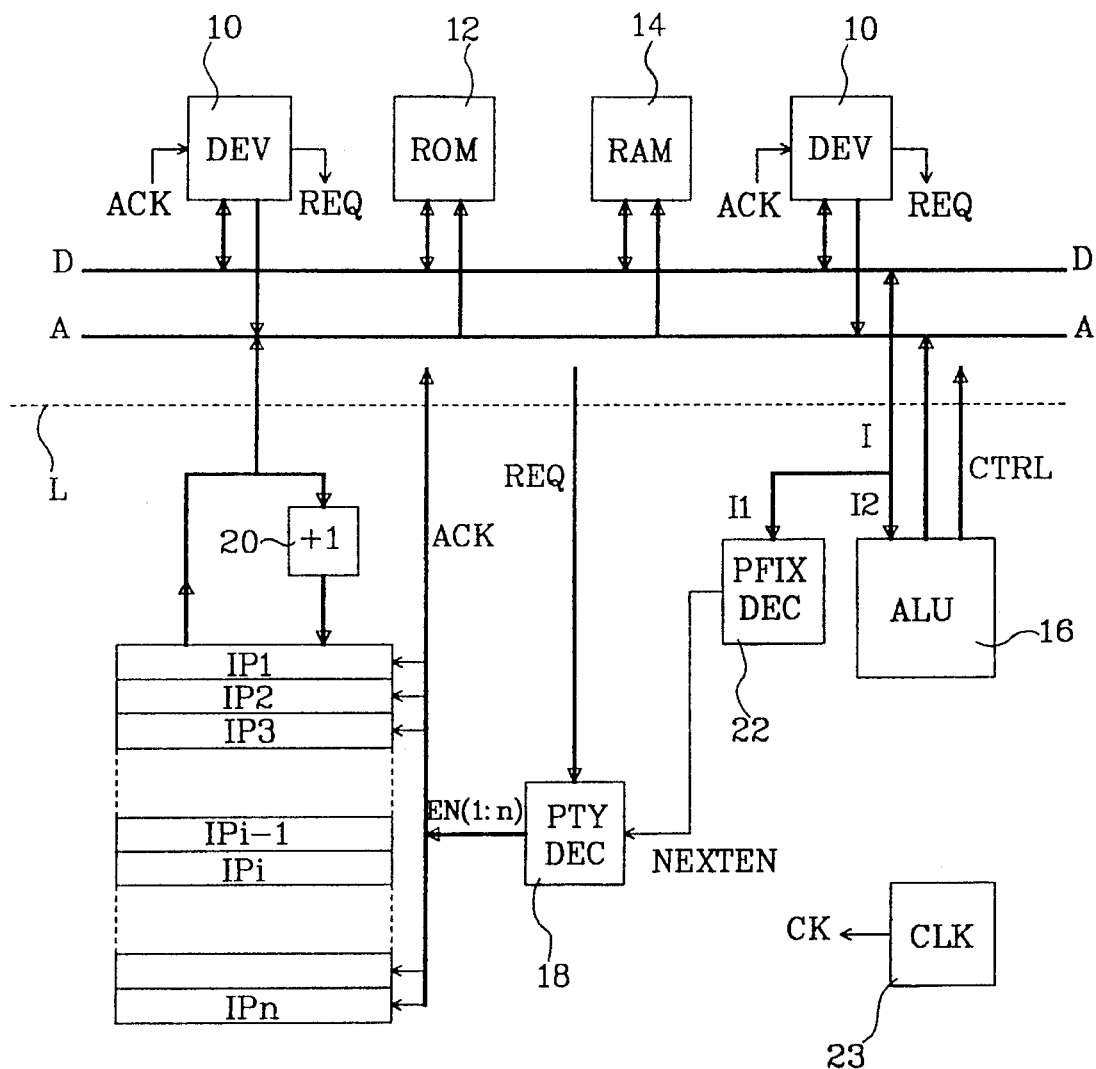
FIG. 1 represents an exemplary multitask processor architecture according to the invention.

In FIG. 1, various devices 10 are connected to a system bus including a data bus D, an address bus A, and a control bus CTRL for, among other operations, selecting a read or write mode of the elements connected to the system bus. A Read Only Memory (ROM) 12 and a Random Access Memory (RAM) 14 are also connected to the system bus.

The main tasks to be executed by a processor in such a system exchange data among devices 10, 12, and 14 and also, if necessary, operate on the data.

An embodiment of the processor according to the invention is represented below a dotted line L. The processor includes an instruction processing unit (IPROC) 16 connected to the system bus D, A, CTRL. This unit 16 is, for example, a conventional instruction processor, typical of those common in microprocessors. A conventional instruction processor first receives, or loads, an instruction I stored in the ROM 12 or RAM 14 device through data bus D and then executes this instruction. The execution of the instruction generally acts on buses D, A, and CTRL.

In a conventional processor, the address at which the instruction is fetched is contained in a single instruction pointer. The content of this instruction pointer has to be saved and restored when the execution of a program is interrupted and is resumed subsequently.

In contrast, the present invention includes a plurality of instruction pointers IP1, IP2 . . . IPn each corresponding to a possible task to be executed. Each of these pointers is enabled by a respective enable line EN1-ENn so that the pointer may provide its content as an address of an instruction to be fetched for processing unit 16. The enable lines EN are controlled by a priority level decoder 18, which receives one request line REQ from each device 10 that may request processing by the processor. Each request line, and hence each device 10, is assigned a priority level. The same priority level may be assigned to several tasks. As such, decoder 18 must enable only one pointer IP at a time. This may be done, for example, by internally assigning different priority levels to these tasks and by circularly shifting these internal priority levels each time an instruction or a group of instructions is executed.

If required, the enable lines EN may function as acknowledge lines ACK of requests issued by devices 10. An acknowledgement may have various effects depending on the nature of the device that receives it.

Programs are stored in the ROM or RAM at distinct locations and respectively correspond to tasks that may be executed. ROM may store basic programs that may be executed in any system of the architecture of FIG. 1. Similarly, RAM may store programs that are selected by a user and loaded from a floppy disk or hard disk, for example. The possibility for a user to load programs in RAM is particularly useful, if the system operates on a modular basis, in which the user may add or remove devices to be controlled on the system bus D, A, CTRL. The maximum number of tasks that the system can control is equal to the number n of instruction pointers IP provided in the processor.

The system operates as follows. Upon powering-on, each instruction pointer IPi (i=1, 2 . . . n) is initialized at a start value $IPi_0$ corresponding to the start address of the associated program. These start addresses can, for example, be stored in a ROM table or on a disk and be transferred into the respective instruction pointers by a boot program, or by an operating system. Additionally, a priority level must be assigned to each program by assigning the rank of an instruction pointer to the associated program, for example. For this purpose, priority decoder 18 is either fixed or programmed at power-on. A programmable decoder comprises, for example, a multiplexer whose output, providing the instruction pointer enable signals, is selected among the contents of registers by the request signals.

Once the system is initialized, requests on lines REQ will likely appear. The priority decoder 18 will enable the instruction pointer IP associated with the request having the highest priority. The instruction processor 16 receives (or loads) the instruction located at the address indicated by the enabled instruction pointer and executes this instruction. Once the instruction is executed, an incrementation circuit 20 increments the enabled instruction pointer. This provides the address of the next instruction to be executed by the instruction processor 16. The incrementation circuit 20 acts only on the enabled pointer. That is, the contents of the other pointers are not modified. The representation (+1) of the incrementation circuit 20 is symbolic. The instructions to be executed are not necessarily located at successive addresses, for example when the instructions have different lengths or when jump or sub-program call instructions are executed. In such a case, the enabled instruction pointer is incremented or decremented by the adequate value, as is known in conventional processors. In most existing microprocessors, the value by which the instruction pointer is incremented or decremented is included within the instructions.

The rank (i) of an instruction pointer IP is used to designate the associated program (or task) and request. A task may correspond to a plurality of looped executions of the associated program, or to the execution of a portion of the program. The task may also be continuous. Thus, the end of a program does not always correspond to the end of the associated task, and vice versa. The end of the task occurs when its request disappears. At such time, the task is said to be served.

When a request i has a higher priority than that of the program being executed, e.g., if program i-1 is the correct program, decoder 18 enables the pointer IPi instead of pointer IPi-1 after the current instruction of program i-1 is executed. As further described below, the enabling of IPi may have to wait until a group of instructions of program IPi-1 is executed. Request i is simultaneously acknowledged by the associated acknowledge line ACK. The instruction pointed to by the new enabled pointer IPi is loaded in the instruction processor 16 and is executed without any loss of time. That is, the new instruction is executed at the moment when the next instruction of program i-1 would have been executed.

Once the task i is served, request i is disabled, and decoder 18 enables the instruction pointer corresponding to a new maximum priority task. The new task may be a task that was suspended by task i, e.g., task i-1, may be an entirely new task. The associated program is executed immediately. If it is a suspended task, it starts from its suspension point. If it is a program corresponding to a task that has not been started yet, it starts at the starting address.

As is readily seen, switching from one task to the other occurs without any dead time that would have been necessary in a conventional system to carry out context saving and restoring.

The operations of the instruction processor 16, of decoder 18, and of the incrementation circuit 20 are synchronized by a common clock signal CK provided by a clock circuit 23 which synchronizes the succession of instruction cycles. The incrementation of the pointers can be done either at the end, or at the beginning of each instruction cycle.

Usually, as conventionally known, the levels having the highest priority are assigned to the shortest tasks. The length of a task is determined by the activation duration of the associated request. Long-lasting tasks that require rapid processing may not comply with this rule. For example, a long task may require high priority to prevent loss of data.

As indicated above, programs associated with determined tasks can be provided to be executed in a loop. Thus, in the system of FIG. 1, the last instruction of such a program is a jump to the first instruction of the program. This jump can be conventionally controlled by the incrementation circuit 20. An optimal method according to the invention is described hereinafter for the control of loops.

In conventional processor systems, there are some groups of instructions whose execution should not be suspended. In a conventional processor, specific instructions disable and enable the servicing of interruption requests. However, in a processor according to the invention, such specific instructions are not suitable because there are no interruptions per se.

To solve this problem, the present invention partitions each instruction I into a prefix I1 and a command I2. Prefix I1 is provided to a prefix decoder 22, and command I2, corresponding to a conventional instruction, is provided to the instruction processor 16. Prefix I1 indicates whether the current program can be suspended or not once the associated instruction is executed to process a program with a higher priority.

The prefix decoder 22 provides to the priority decoder 18 a signal NEXTEN that, if the prefix is at a specific value, inhibits the enabling of a new instruction pointer, even if a request having higher priority than that of the current program appears.

Figure 2:
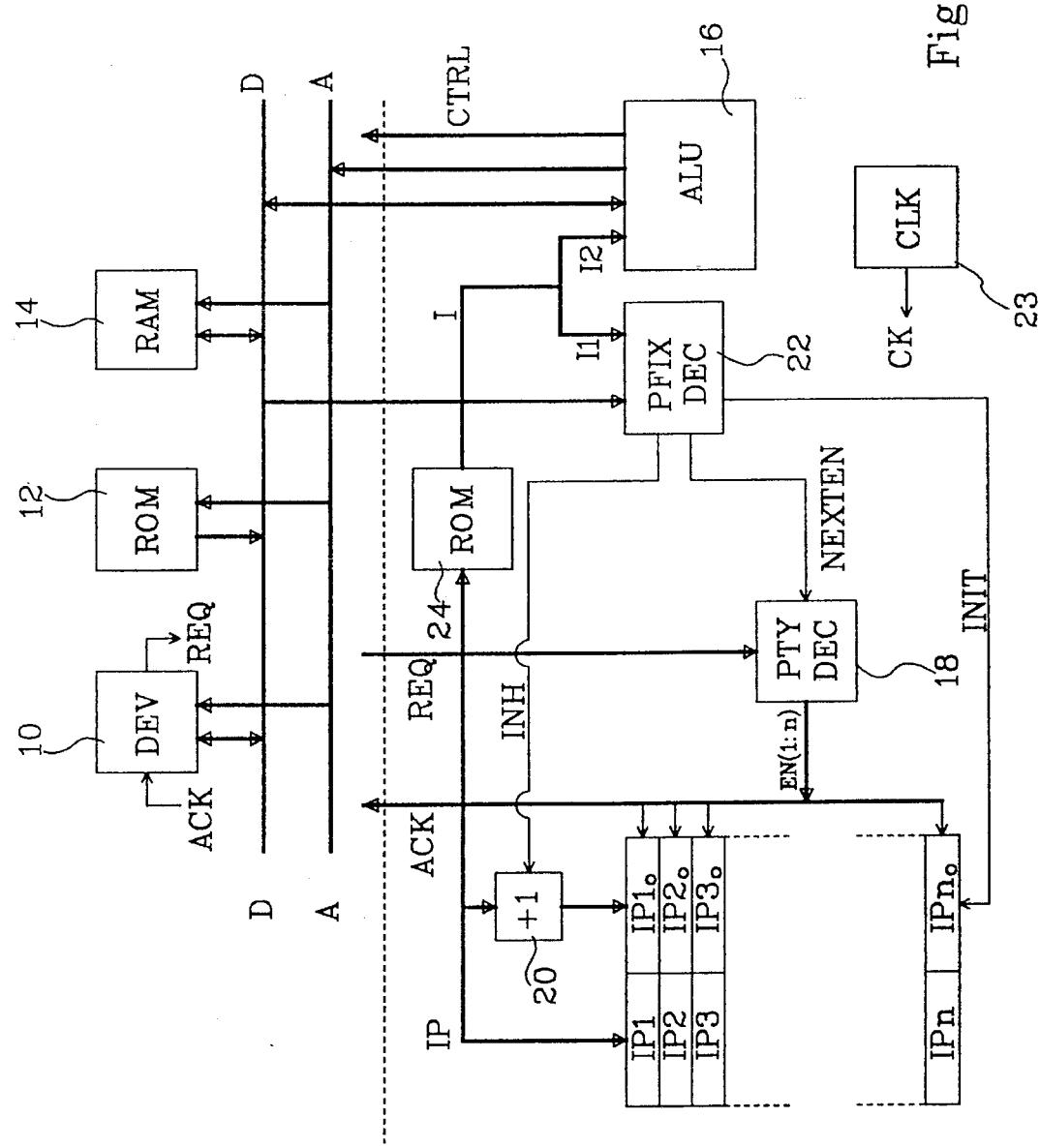
FIG. 2 represents an alternative exemplary processor architecture according to the invention.

FIG. 2 represents an alternative embodiment of a multitask processor architecture according to the invention. Same elements as in FIG. 1 are designated with same reference numerals. This architecture is adapted to a multitask system having predefined tasks. The programs corresponding to the tasks are stored in a ROM 24 that is independent of the system bus D, A, CTRL. The content of the enabled instruction pointer IPi is directly provided to the address input of ROM 24 instead of being provided to the address bus A. The instruction processor 16 is coupled, as previously, to the system bus D, A, CTRL but is modified to directly receive instructions from ROM 24. Such a modification of a conventional processor may be easily achieved by those skilled in the art.

A conventional processor includes an instruction register and work registers that are coupled to the data bus D. When an instruction is loaded, it is written in the instruction register, and when this instruction is executed, operations occur between the data bus D and the work registers. According to the invention, instead of coupling the instruction register to the data bus D, this instruction register is coupled to the output of ROM 24. With such a system, an instruction is executed as soon as it is loaded in the instruction processor 16. Thus, the system bus is not needed by the instruction processor 16 to obtain instructions. This represents a significant gain of time.

Additional optimizations can be associated with the system of FIG. 2. The prefix I1 of the instructions is provided so as to indicate, by an adequate number of bits, not only whether or not the current program may be suspended after the current instruction, but also whether the current instruction should be executed a predetermined number of times. The prefix I1 may also be used to indicate whether the current instruction is the last instruction of the program.

The prefix decoder 22 includes a down-counter of instruction cycles that is initialized by a number within prefix I1. This number can be a number selected among several constant numbers that are encoded by the prefix decoder or a number N provided by the data bus D. This number N is calculated and stored in the memory, or is provided by the served device 10. When such a loop instruction is executed, the prefix decoder 22 inhibits the incrementation circuit 20 during the desired number of instruction cycles. As a result, the loaded instruction is executed as many times as desired.

This method spares a jump instruction for each loop to be executed, which is a significant gain of time if only one instruction is to be executed several times consecutively. Such instruction loops are particularly useful when data are to be transferred by blocks from one element of the system bus to the other.

In the embodiment of FIG. 2, each instruction pointer IP includes two registers: one contains the address of the instruction to be executed of the associated program, and the other contains the start address $IP_0$ of this program. Several solutions to provide values $IP_0$ are available. For example, ROM 24 can include a table of start addresses, and these addresses may be written in the corresponding registers during initialization. If the programs in the ROM 24 are identical from one system to another, their start addresses $IP_0$ may be hard wired. This last solution avoids having to couple pointers IP to the system bus, which simplifies the processor structure.

If prefix I1 indicates that the instruction being executed is the last one, once the instruction is executed decoder 22 provides a signal INIT to the group of instruction pointers IP, which causes the enabled pointer only to be initialized with the program start address.

With such a system, the instruction set of the processor can, in some cases, be restricted to a set that does not include any jump instruction, which significantly simplifies the processor, more particularly the incrementation circuit 20.

Figure 3:
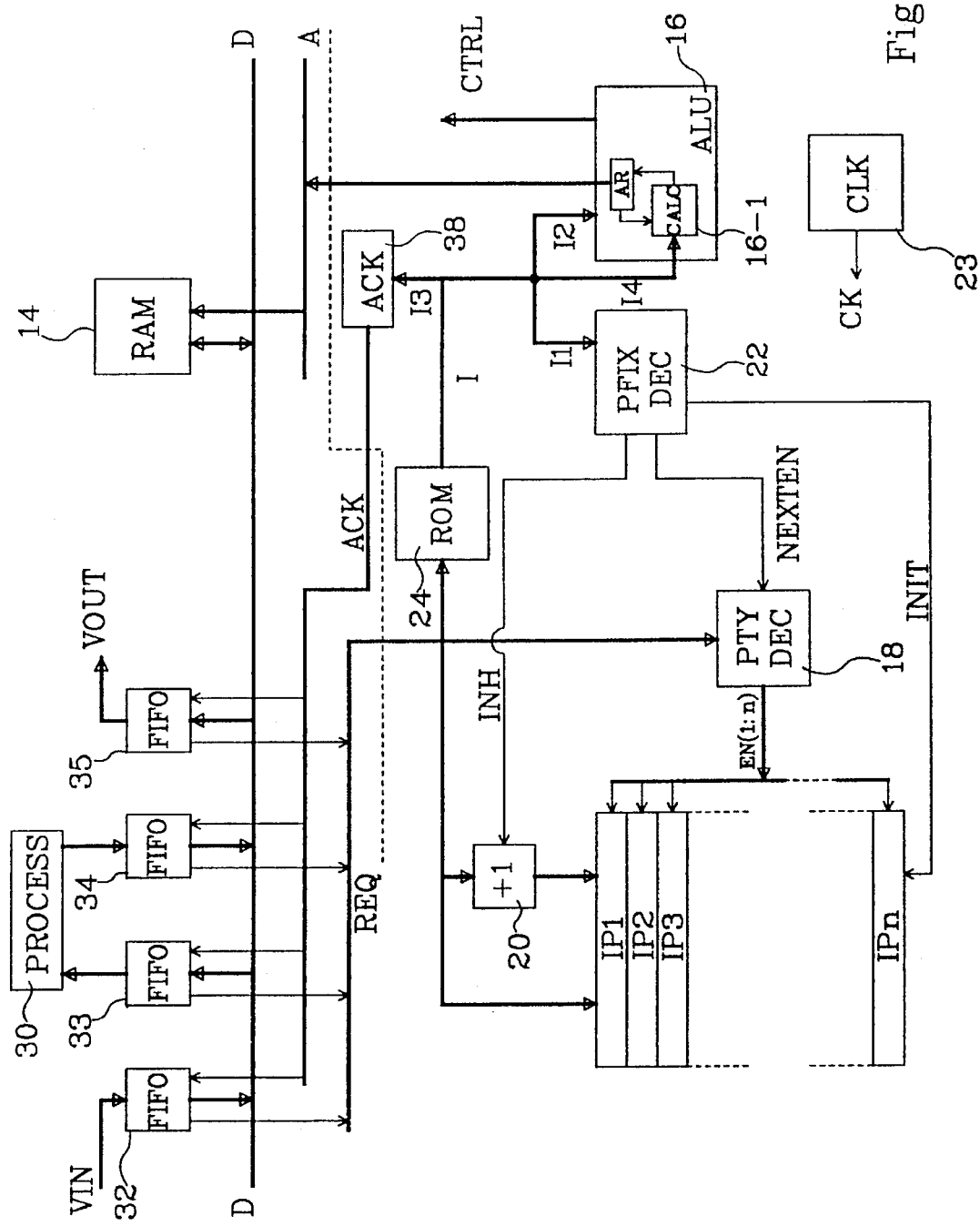
FIG. 3 represents an exemplary processor architecture according to the invention, more particularly adapted to a signal processing system.

FIG. 3 represents an embodiment of a processor architecture according to the invention that is adapted to a signal processing system, for example for video signals. Same elements as in FIG. 2 are designated with same reference numerals.

In a time-sharing signal processing system, as the system of EP-A-0,503,956, signal processing per se is carried out by specialized circuits. The processor only transfers data from a RAM to the various processing circuits.

The architecture of FIG. 3 is designed to transfer into RAM 14 a continuous flow of data coming on a bus VIN and to transfer contents of the RAM to a processing circuit 30. In addition, the architecture is designed to transfer data processed by circuit 30 to the RAM and finally to transfer the contents of the RAM to an output bus VOUT. The intermediate passages through RAM 14 are necessary because data may arrive in an unsuitable order between the input bus VIN and the processing circuit 30, or because data may arrive in an unsuitable order between the processing circuit 30 and the output bus VOUT, or because data being processed may be combined with data that were previously processed. RAM 14 may conveniently be called a "transit memory".

The tasks to be executed in the system of FIG. 3 include calculating the adequate addresses so that the data arriving on bus VIN are stored in the proper order in a first RAM area so that they may be sequentially transferred to the processing circuit 30, and so that processed data are stored in the proper order in a second RAM area so that they may be sequentially transferred onto the output bus VOUT.

The input bus VIN, the input and output of the processing circuit 30, and the output bus VOUT, are coupled to the data bus D through respective first in-first out memories ("FIFO") 32, 33, 34, 35. Each FIFO 32–35 is connected to a request line REQ. FIFOs 32 and 34 are read-only memories with respect to data bus D and issue an active request when their contents exceed a predetermined maximum content and when they must be emptied through the system bus. FIFOs 33 and 35 are write-only memories with respect to data bus D, and issue an active request when their content is lower than a predetermined minimum content and when they may be filled through the bus. The requests of the FIFOs are acknowledged through respective acknowledge lines ACK that are coupled, unlike in the preceding figures, to an acknowledge circuit 38.

The acknowledge circuit 38 receives an additional field I3 from each instruction I provided by ROM 24. With this configuration, the FIFOs 32–35, and any other read or write-only device connected to the data bus D, can be directly selected by the instruction being executed (more precisely by its field I3), without issuing any address on the address bus A. This may cause a datum that is read in the RAM to be directly written in a write-only device, and may cause a datum that is read in a read-only device to be directly written in the RAM, without having to carry out a read cycle, followed by a write cycle. Thus, it is unnecessary to couple the instruction processor 16 to the data bus D. Circuit 38 is, if necessary, a decoder and/or a circuit for adequately formatting the acknowledgements (it may be necessary to delay the acknowledgement signals, for example to give the RAM time to present data on bus D before they are read by a FIFO memory).

Such a system operates as follows. The two highest priority levels are assigned to the requests of FIFOs 32 and 35, because these FIFOs must respectively receive on bus VIN and provide on bus VOUT continuous flows of data. If compressed data arrive on bus VIN and decompressed data are transmitted on bus VOUT, the flow of data is slower on bus VIN than on bus VOUT. The highest priority is then assigned to the request of FIFO 35. If non compressed data arrives on bus VIN and compressed data are transmitted on bus VOUT, the highest priority level is assigned to the request of FIFO 32. Lower priority levels are successively assigned to the requests of FIFO 33 and of FIFO 34.

As indicated above, a write-only FIFO (FIFOs 33 and 35) issues a request when its content is lower than a minimum content, for example equal to half the FIFO memory size. The task associated with a write-only FIFO transfers a packet of data from the RAM to the FIFO, the size of this packet of data being fixed and, for example, equal to half the size of the FIFO.

Such a transfer operation consists in a looped execution, as indicated above, of a RAM read instruction, the number of loops being determined by the prefix I1 of the read instruction. During each execution of the read instruction, RAM 14 provides on bus D a datum that is immediately transferred into the FIFO. The writing operations of data into the FIFO are synchronized with edges of the clock signal CK.

A read-only FIFO (FIFOs 32 and 34) issues a request when the number of data contained therein exceeds a maximum content, for example, equal to half the size of the FIFO. The task associated with the FIFO transfers the content of the FIFO into RAM 14 by packets of data. Each packet contains a fixed number of data equal, for example, to half the size of the FIFO.

Such a transfer operation consists in a looped execution of a RAM write instruction, the number of loops being determined by the prefix I1 of the write instruction. Once the acknowledgement signal of the FIFO is activated, the FIFO provides its data on the bus at the rate of the clock signal CK, which is also the execution rate of the write instructions. Thus, each datum provided by the FIFO on the bus is immediately written in the RAM.

In order to determine the address in RAM 14 from which packets of data must be transferred, it is possible, for example, to update a pointer stored in RAM. The instruction processor 16 includes an address register AR containing the address at which a transfer (read or write) operation is carried out. The beginning of a transfer program of a packet of data includes an instruction that writes in this address register the content of the pointer. The subsequent instructions of the program are, for example, instructions to adequately modify the content of the address register at each transfer instruction. This adequate modification may consist in an incrementation or in a more complex calculation, for example a recursive operation.

However, the execution of the modification instructions of the address register AR at each execution of a transfer instruction requires that instructions be inserted, before or after the transfer instruction. The modification instructions are executed during the same loop as the transfer instruction. This method is incompatible with the advantage provided by the use of prefix I1 that allows to indicate that only the current instruction has to be looped.

To avoid this drawback and to further increase the speed of the system, the instruction processor 16 includes an address calculation unit 16-1 that has a given number of predetermined functions for the address calculation. Each function may have dedicated hardware to perform the function. Each calculation function of the calculation unit 16-1 is selected by an additional field I4 of the instruction I being processed (field I4 can also correspond to acknowledge field I3). Thus, for each instruction to be executed, a specific address calculation function is selected. Each hard wired function is designed to modify the state of register AR in synchronism with the instruction cycles (with clock CK). This configuration allows the looped execution of a single read or write instruction. The read or write operation occurs at the address in register AR, and the address is automatically and adequately updated at each loop.

A transfer program to transfer a packet of n data from a FIFO to the RAM is now considered. This transfer program corresponds to the task initiated by a request provided by the FIFO. Number n is selected high enough so that the considered FIFO deactivates its request once it has received the $n^{th}$ datum of the packet.

Such a program may consist of the following instructions:

One instruction to load in register AR the last address used during the last execution of the current task (this address being, for example, stored in RAM at a position assigned to the task). The prefix I1 of this instruction indicates that the task must not be suspended (by a task of higher priority) after the execution of the instruction. Fields I3 and I4 contain inactive values.

One transfer instruction, whose prefix I1 indicates that this instruction must be executed n times and that the task must not be suspended. Field I3 selects the device to be processed (32–35), and field I4 selects the address calculation function to be used.

One instruction to save the content of register AR, whose prefix I1 indicates that the execution of the program must continue from its beginning and that the task may be suspended. Fields I3 and I4 contain inactive values.

Such a task can only give control to a task of higher priority level at the last instruction of the program (which is the only instruction authorizing the suspension of the task), that is, when the whole packet of data is transferred. If the number n of data in a packet is high, it may be necessary to give control more frequently to a task of higher priority.

To achieve this purpose, a first approach consists in partitioning the packet of n data into p sub-packets of $n_1$ .. . $n_i$ ... $n_p$ data, respectively, and to provide a transfer program including p successive transfer sub-programs of $n_1$ ... $n_i$ ... $n_p$ data, respectively. Each sub-program includes the three above-mentioned instructions, except that the transfer instruction is executed $n_i$ times instead of n times, and that only the save AR instruction of the last sub-program indicates that the program must be continued from its beginning. This allows a task of higher priority at the end of each sub-program to gain control, i.e., after a relatively short latency time at most equal to the transfer of $n_i$ data (instead of n data). This also allows to select, at each sub-program, a distinct address calculation function, and therefore to partition a complex calculation function into simple sub-functions, that may also be used for other tasks.

However, this approach requires the execution of a save instruction between two transfers of $n_i$ data, and of an update instruction of register AR, which slows down the process.

A second approach, avoiding this drawback, consists in providing the instruction processor 16 with as many address registers AR as calculation functions. Thus, each calculation function carries out operations on its own address register and, if the function is suspended (because the associated task is suspended), the associated address register maintains the address from which to continue once the function is reactivated. It is then unnecessary to update or save these address registers. As a result, a transfer program only consists of a possible first update instruction of an address register, a possible last save instruction and, therebetween, a series of transfer instructions, each of which is to be executed in loops, the prefix I1 of each transfer instruction indicating the number of loops.

The program must not be suspended during the execution of a looped instruction. To achieve this purpose, the field I1 of the looped instruction indicates by an active bit (as above mentioned with relation to FIG. 1) that the program must not be suspended. This active bit is received by the prefix decoder 22 that then does not authorize activation of signal NEXTEN, which serves to indicate that the current program may be suspended.

Figure 4A:
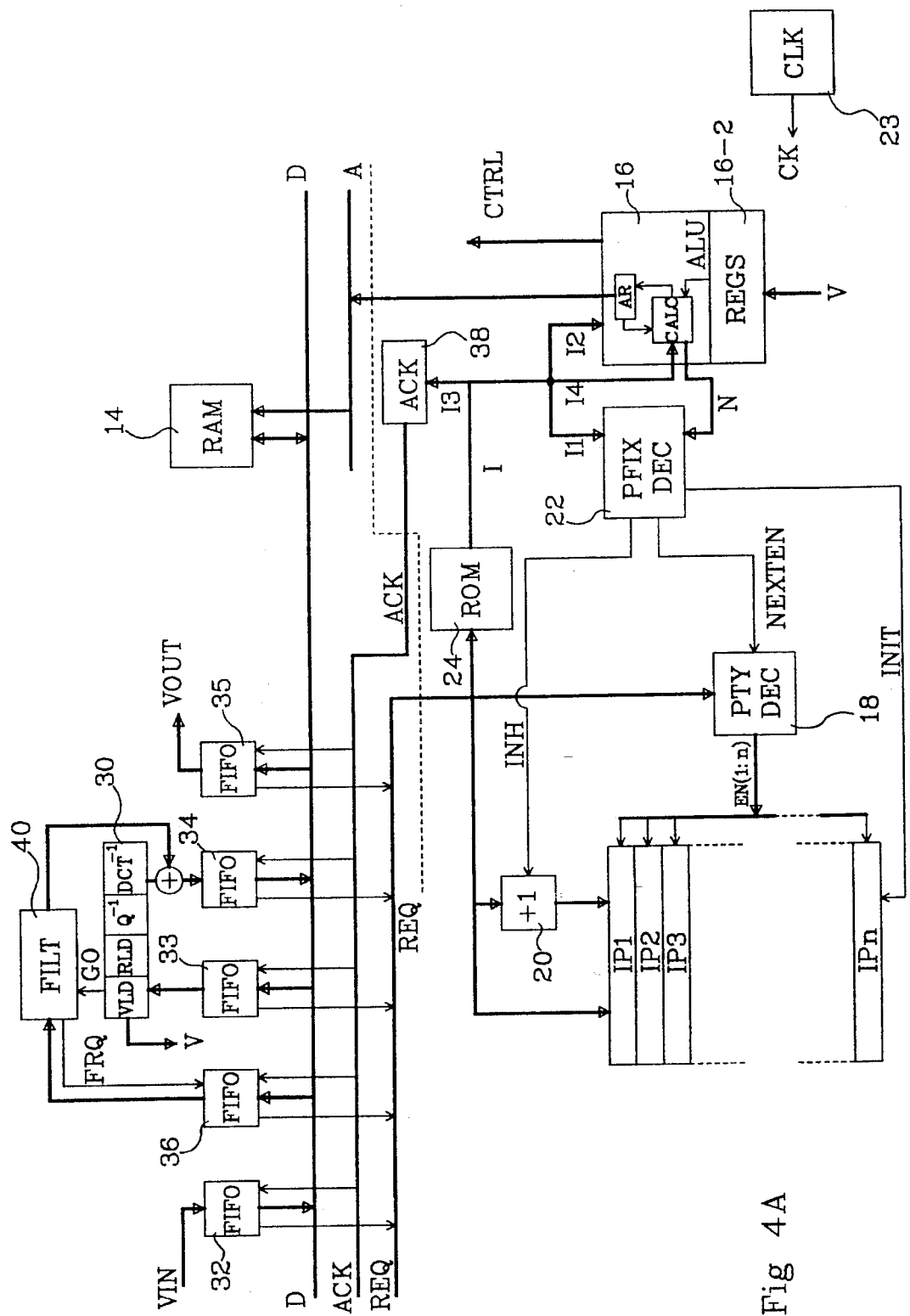
FIG. 4A represents a simplified exemplary processor architecture according to the invention more particularly adapted to an image processing system.

FIG. 4A represents an embodiment of a processor architecture according to the invention adapted to an image processing system, for example a decompression (or decoding) system of video signals compressed (encoded) in accordance with an MPEG standard. This system is based on the system of FIG. 3, where same elements are designated with same reference numerals. The processing circuit 30 is a decoder including a Variable Length Decoder (VLD), a Run Length Decoder (RLD), an inverse quantification circuit $Q^{-1}$, and an inverse discrete cosine transform circuit (DCT$^{-1}$). An additional write-only FIFO 36 is connected to the data bus D, to the acknowledgement bus ACK, and to the request bus REQ. FIFO 36 provides data to a filter 40. The data filtered by this filter are added to the output of decoder 30. FIFO 36 only issues requests if filter 40 activates a line FRQ to indicate that the filter needs to receive data.

The VLD of circuit 30 is connected to registers 16-2 of the instruction processor 16 through a bus V. Decoder VLD is also connected to filter 40 through an activation line GO of the filter.

The calculation unit 16-1 of the instruction processor 16 provides to the prefix decoder 22 the above number N that is intended to indicate the number of times an instruction mush be looped.

The RAM 14 used in the present case is a dynamic RAM (DRAM). The advantage of DRAMs is that they are small-sized, inexpensive, and have a large storing capacity. However, DRAMs must be accessed in two steps. A DRAM is partitioned into several pages. Before reading or writing in a DRAM, a page must be selected through a specific addressing cycle. Then, a cell must be selected in this page through a normal read or write cycle.

In an image processing system as the one shown in FIG. 4A, the DRAM is partitioned into a plurality of regions. A first region is intended to receive the compressed data provided through bus VIN. Second to fourth regions are intended to store the image being processed by decoder 30, as well as the last two processed images. The image to be displayed (to be sent on bus VOUT) is read from one of these last three cells.

Figure 4B:
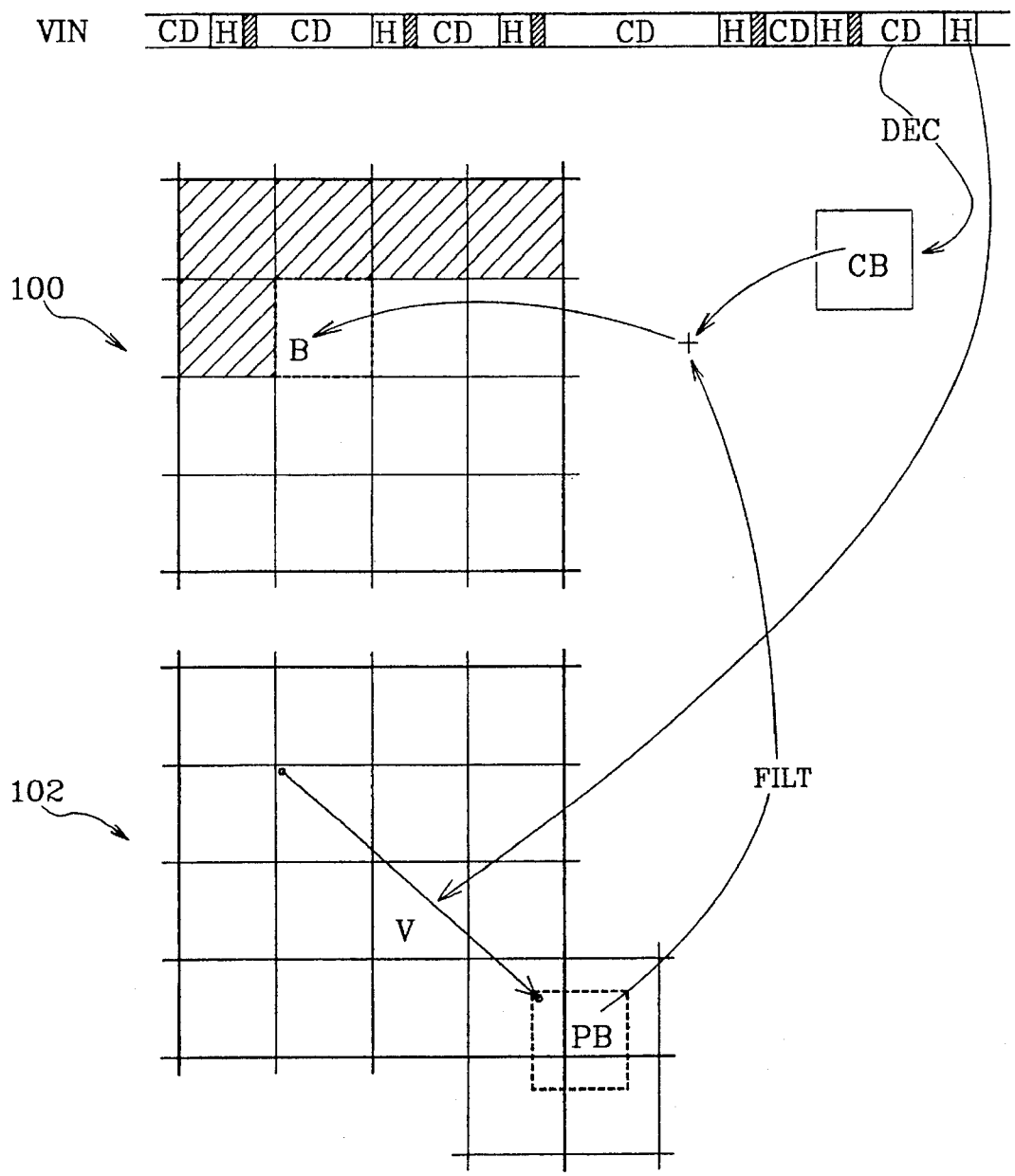
FIG. 4B represents block diagrams of data corresponding to image portions processed by an image processing system operating in accordance with an MPEG standard.

FIG. 4B represents a flow of data arriving on bus VIN. Portion 100 of the DRAM region is used to store the image being processed, and a portion 102 of one of the DRAM regions is used to store the last two processed images.

The flow of data arriving on bus VIN includes packets of compressed data CD, having variable lengths, preceded by a header H. The successive packets CD correspond to successive squares, for example 16×16 pixels, of an image. Each packet, once it is decoded, becomes a so-called "macro-block". A macro-block is partitioned into a luminance block Y of 16×16 pixels, for example, and into two chrominance blocks, U and V, of 8×8 pixels each, for example. A DRAM region intended to store one image is partitioned into two sub-regions, one to store the luminance blocks Y, and the other to store the chrominance blocks U and V. The chrominance blocks are thus separated from the luminance blocks so as to enter a whole number of blocks into a DRAM page. To simplify the description, the two above-mentioned sub-regions are shown merged. Thus, reading or writing a macro-block in a memory region amounts to reading or writing the luminance block Y in the first sub-region and the corresponding chrominance blocks U, V in the second sub-region. In order to transfer a macro-block between the DRAM and a FIFO, an address calculation function is required to control reading or writing of blocks Y in the first sub-region, and reading or writing of blocks U and V in the second sub-region.

In accordance with MPEG standards, there are three macro-block reconstruction types, namely: "intra", "predicted" and "bidirectional". In intra reconstructions, the macro-blocks provided by decoder 30 directly correspond to an image portion and need no additional processing.

In predicted reconstructions, a macro-block of an image being reconstructed is combined with a macro-block of a previously reconstructed image (a "predictor"). The macro-block provided by decoder 30 is only a correction macro-block that is added to the filtered predictor to form a current macro-block.

A predictor can be searched in an image, in display order, following or preceding the image being reconstructed. Of course, to allow this, images arrive in an adequate order, distinct from the display order.

In bidirectional reconstructions, a macro-block of an image being reconstructed is combined with two macro-blocks, also referred to as predictors, of two previously reconstructed images, respectively. These two previously reconstructed images respectively correspond to the image preceding the image being reconstructed and the image following the image being reconstructed. The macro-block provided by decoder 30 is also a correction macro-block.

FIG. 4B illustrates a predicted reconstruction of a macro-block B of an image being reconstructed in the memory region 100. Hatched portions of this memory region represent previously reconstructed macro-blocks. Memory region 102 stores a full image that was previously reconstructed. The header H of a packet of data indicates the type of reconstruction to operate on data CD arriving after this header. In the case of a predicted reconstruction, data CD are decoded to form a correction macro-block CB. As the pixels of macro-block CB are provided, they are added to the pixels of a predictor PB searched in memory region 102, the pixels of this predictor PB being previously filtered. The position of predictor PB in region 102 is determined by a vector V provided by header H. Vector V provides the relative position of predictor P with respect to the position corresponding, in region 102, to the position of the block B to be reconstructed in region 100.

The operation of the system of FIG. 4A is now considered. The tasks associated with the various FIFOs are listed below according to an exemplary decreasing order of priority:

transferring from DRAM to bus VOUT (FIFO 35),
transferring from bus VIN to DRAM (FIFO 32),
transferring from DRAM to decoder 30 (FIFO 33),
transferring from DRAM to filter 40 (FIFO 36), and
transferring from decoder 30 to DRAM (FIFO 34).

The size of the FIFOs 34–36 is, for example, of two macro-blocks, that is, two blocks of 16×16 pixels (luminance), and four blocks of 8×8 pixels (chrominance). FIFOs 34–36 issue a request when they contain one macro-block. The size of FIFOs 32 and 33 is, for example, of two packets of compressed data of an average size, and they issue a request when they are half full.

The operation of the system of FIG. 4A in the case of an intra reconstruction is identical to the operation of FIG. 3 since filter 40, which processes predictors, is not involved.

The task associated with FIFO 32 consists in writing half of its content in a first DRAM region. The data is written in DRAM at successive addresses.

The task associated with FIFO 33 consists in filling half of FIFO 33 with data stored in the first above-mentioned region. The data is read from the DRAM at the successive addresses.

The address calculation functions associated with these tasks consist in a simple address incrementation.

The task associated with FIFO 34 consists in emptying FIFO 34 of one macro-block and writing this macro-block in one of the second to fourth image regions of the DRAM. These image regions are cyclically filled so that two reconstructed images and one image being reconstructed are always available. The macro-blocks are written in the considered image region, for example, so that the memory cells of successive addresses correspond to successive pixels of the image lines.

The task associated with FIFO 35 consists in filling FIFO 35 with a macro-block read in a region containing the image to be displayed. As discussed above, this region is one of the second to fourth regions. The addresses are generated so as to read memory cells corresponding to successive pixels of the image lines. It may sometimes be necessary to read pixels in an image region that is to be filled. In this case, the filling will start shortly after the system has started to read the pixels. The pixels that are to be read will not be overwritten by the macro-blocks that are being written.

As indicated above, each macro-block includes a luminance block stored in a first sub-region of the image region and two chrominance blocks stored in a second sub-region of the image region. The address calculation functions control the separation of the data during writing, and the grouping of the data during reading, in addition to controlling the writing or reading of pixels in the sub-regions.

In the case of a predicted or bidirectional reconstruction, the system operates as follows. The tasks associated with FIFOs 32–35 are those described above. When the VLD receives a header including a prediction vector V, it activates filter 40 by sending a signal GO, and the VLD simultaneously sends vector V to registers 16-2 of the instruction processor 16. Filter 40 activates line FRQ to enable request issues by FIFO 36. Since FIFO 35 is initially empty, it immediately issues a request.

The task associated with FIFO 36 then writes in FIFO 36 the predictor indicated by vector V. The program associated with this task includes a looped instruction for reading the DRAM and for selecting, through its field I4, a specific address calculation function that uses vector V to locate where the predictor is to be read. In the case of a bidirectional reconstruction, vector V is double and indicates the position of each of the two required predictors. The address calculation function is then such that the two predictors are read alternatively by groups of pixels.

As represented in FIG. 4B, a predictor PB can overlap several pages of the DRAM (the boundaries of the pages are illustrated by bold lines). Reading of the predictor is then more complex. In such a case, the selected calculation function provides a number N to the prefix decoder. Number N indicates, for example, the height in pixels of the predictor's columns within an upper page partially containing the predictor. Reading the predictor consists in executing, for each whole column, N read instructions to read the pixels of the first portion of the column that is contained in an upper page, then L-N read instructions for the remaining portion of the column in a lower page (L being the total height in pixels of a column). A change in DRAM page is performed between the two reading loops.

With this configuration, a predictor is read in a suitable order, which avoids the need for providing a complex address calculation function to reorder the pixels of the predictor and a buffer to temporarily store the predictor pixels before they are reordered. In the above EP-A-0,503,956 patent application, all the pixels of the partial predictor contained in a page are first read before reading the pixels of the partial predictor contained in another page, in order to minimize the number of page changes at the expense of a higher complexity. According to the invention, it is possible to execute a larger number of page changes because the system is sufficiently rapid. Additionally, this increase in the number of page changes practically represents about 4 clock cycles in one hundred.

Those skilled in the art will be able to easily realize logic circuits to execute the various functions required for the address calculation.

It should be noted that the invention applies to a memory controller of a shared-time image processing system. Thus, the whole system has been described in a simplified manner to clearly show the aspects that the invention improves in such a system. Those skilled in the art will be able to realize a whole image processing system with the information given in the present description and the instructions provided by the MPEG standards.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A processor architecture for serving a current task from among a plurality of tasks, including:

a memory for storing instructions of a plurality of programs respectively corresponding to the plurality of tasks, the memory being connected to a data bus and an address bus;

an instruction processor coupled to the data bus to sequentially receive instructions from the memory to be processed at the rate of instruction cycles;

request lines of different priority levels associated respectively with the tasks, each request line being asserted as soon as the associated task is requesting to be served;

a plurality of instruction pointers respectively associated with the tasks, each containing an address of a current instruction of the associated task to be executed, and one of the instruction pointers providing its content on said address bus at each instruction cycle as long as an associated enable line is asserted, whereby a corresponding instruction is provided to the instruction processor and executed at each instruction cycle;

a priority level decoder connected to the request lines and to the enable lines of the instruction pointers, the priority encoder asserting the enable line of the instruction pointer corresponding to the asserted request line of highest priority level; and an incrementation circuit connected to the instruction pointers to modify the instruction pointer associated with the asserted enable line at each instruction cycle to point to the next instruction of the associated task.

2. The architecture of claim 1, further comprising a prefix decoder and wherein each instruction includes a command field that is provided to the instruction processor and an instruction type field that is provided to the prefix decoder, the prefix decoder including:

means for authorizing a new instruction pointer to be enabled by the priority level decoder if the type field of the current instruction has a first predetermined value; and means for initializing the content of the enabled instruction pointer to the start address of the current program if the type field of the current instruction has a second predetermined value.

3. The architecture of claim 2, wherein the prefix decoder includes means for inhibiting the incrementation circuit if the type field has a third predetermined value, so that the current instruction is executed at each instruction cycle a number of times determined by said third value.

4. The architecture of claim 1, wherein the memory is independent of a system bus which is controlled by the instruction processor.

5. The architecture of claim 4, wherein devices are coupled to the system bus and wherein each instruction includes a command field that is provided to the instruction processor and an acknowledge field that enables selected of said devices to use the system bus when the instruction is being executed.

6. The architecture of claim 5, wherein a transit memory is coupled to the system bus and wherein said devices that are coupled to the system bus include:

at least one read-only device, respective to the system bus, which asserts an associated request line to indicate that it needs to transfer data to the transit memory, an acknowledgment of said request selecting only said read-only device to use the system bus, while a task for transferring data from the system bus to the transit memory is executed; and at least one write-only device, respective to the system bus, which asserts an associated request line when it needs to receive data from the transit memory, an acknowledgment of this request selecting only said write-only device while a task for transferring data from the transit memory to the system bus is executed.

7. The architecture of claim 6, wherein the instruction processor includes a plurality of wired address calculation functions, each function being selected by a field of a read or write instruction being executed.

8. The architecture of claim 7, wherein each address calculation function is associated with an address register for holding an address for the transit memory, the address calculation function including circuitry for adequately modifying the content of its associated address register.

9. A multitask processor for serving tasks associated with a plurality of devices, each device being coupled to a system bus, and each device providing a request signal when that device needs to be served, the processor comprising:

a first memory for storing a plurality of sets of instructions, each set of instructions being associated with one of the tasks;

a processing unit for executing the instructions at the rate of instruction cycles, the processing unit being coupled to the system bus;

a plurality of instruction pointers, each instruction pointer being associated with a task and holding an address of a current instruction in the first memory associated with the task, wherein when an address from an instruction pointer is provided to the first memory the current instruction associated with the task is provided to the processing unit;

means for prioritizing the request signals, including means for enabling an instruction pointer associated with the request signal having highest priority to provide its address to the first memory; and means for updating at the rate of instruction cycles the instruction pointer that is enabled by the means for enabling so that the enabled instruction pointer is updated to point to the next instruction of the associated task.

10. The processor of claim 9 further including a prefix decoder, wherein each instruction includes a type field that is received by the prefix decoder, the prefix decoder having means for authorizing the means for prioritizing to enable a new instruction pointer, if the type field has a first predetermined value.

11. The processor of claim 10 wherein the prefix decoder includes means for inhibiting the means for updating from updating the instruction pointer.

12. The processor of claim 10 wherein the instruction pointers also store start addresses of the associated tasks and wherein the prefix decoder includes means for initializing the instruction pointer such that the current address is initialized to the start address of the associated task.

13. The processor of claim 9 further including means for providing acknowledgment signals to the devices, the acknowledgment signals enabling the device to transmit data on the bus or to receive data from the bus.

14. The processor of claim 13 wherein the instructions include an acknowledgment field received by the means for providing acknowledgment signals.

15. A method of serving a plurality of tasks associated with a plurality of devices, each device indicating that service is required by asserting a request signal on an associated request line, each of the request lines having an associated priority level, the method comprising the steps of:

a) recognizing a request line having an asserted request signal and being of the highest priority of the request lines having an asserted request signal;

b) enabling an instruction pointer from a plurality of instruction pointers, the enabled instruction pointer being associated with the recognized request line;

c) providing the contents of the enabled instruction pointer as an address to a program memory having instructions;

d) providing the instruction located at the address associated with the enabled instruction pointer to a processing unit;

e) the processing unit executing the instruction that is provided at the rate of instruction cycles; and f) updating the enabled instruction pointer at the rate of instruction cycles so that the instruction pointer points to the next instruction of the associated task.

16. The method of claim 15 wherein the each instruction includes a type field and wherein the method further comprises a step (g) of determining whether the type field has a first predetermined value and wherein step (b) enables a new instruction pointer, if step (g) determines that the type field has the first predetermined value.

17. The method of claim 16 further comprising the step of (h) inhibiting the updating of the instruction pointer in step (f) if the type field has a second predetermined value.

* * * * *